United States Patent [19]

Hanma et al.

[11] Patent Number: 4,675,747
[45] Date of Patent: Jun. 23, 1987

[54] ELECTRONIC STILL CAMERA

[75] Inventors: Kentaro Hanma; Michio Masuda, both of Yokohama, Japan

[73] Assignee: Hitachi, Ltd., Tokyo, Japan

[21] Appl. No.: 507,462

[22] Filed: Jun. 24, 1983

[30] Foreign Application Priority Data

Jun. 25, 1982 [JP] Japan ................................ 57-108446

[51] Int. Cl.[4] .......................... H04N 5/78; H04N 7/18
[52] U.S. Cl. .................................. 358/335; 360/35.1; 358/906
[58] Field of Search ................ 358/906, 335; 360/35.1

[56] References Cited

U.S. PATENT DOCUMENTS

| 4,131,919 | 12/1978 | Lloyed et al. | 358/906 |
| 4,386,376 | 5/1983 | Takimoto et al. | 358/906 |
| 4,400,743 | 8/1983 | Takimoto et al. | 358/906 |
| 4,527,205 | 7/1985 | Konishi | 360/35.1 |

Primary Examiner—Raymond F. Cardillo
Assistant Examiner—Hoa T. Nguyen
Attorney, Agent, or Firm—Antonelli, Terry & Wands

[57] ABSTRACT

An electronic still camera including a shutter, an image sensor, a recording device for recording an output signal from the image sensor, a power source for supplying electric power to the image sensor and recording device, and a shutter button is disclosed in which immediately after the operation of the shutter button is detected, the shutter is made open and an optical image of a body to be imaged is formed on the light receiving surface of the image sensor in a state that scanning and reading operations for the image sensor are inhibited, the above state is maintained till the recording device reaches a recordable state, to accumulate an electric charge corresponding to the optical image in the image sensor for an open period of the shutter, and a scanning operation for the image sensor is started after the recording device has reached the recordable state, in order for the recording device to record the output signal from the image sensor.

7 Claims, 4 Drawing Figures

ELECTRONIC STILL CAMERA

BACKGROUND OF THE INVENTION

The present invention relates to an imaging/recording device, and more particularly to an electronic still camera for recording a still picture image using the principle of a video camera.

Recently, attention has been paid to the so-called electronic still camera in which a still picture image is recorded on a movable recording medium such as a magnetic disc and a magnetic tape on the basis of the principle of a video camera. The video camera has a large recording capacity to continuously record a moving picture image for a long time. On the other hand, the electronic still camera does not have such a large recording capacity, but is small in size and easy to operate.

The structure of the electronic still camera will be explained briefly, with reference to FIG. 1 showing an example of conventional electronic still cameras. In FIG. 1, reference numeral 1 designates an imaging lens usually formed of a plurality of lenses and incorporating an optical stop for controlling the quantity of incident light, to form an optical image of a subject (namely, a body to be imaged) on an image sensor which will be mentioned later, 2 a mechanical or electrical shutter performing the opening and closing action in response to an electric control signal, 3 an image sensor such as an MOS, charge coupled device, 4 a signal processing circuit for processing a picture image a representing signal read out from the image sensor 3 to form a recording signal recorded on a recording medium, 5 a recording medium such as a rotatable magnetic disc, 6 a control circuit for controlling the operations of various parts (that is, various blocks), 7 a power source for supplying electric power to each of the blocks, 8 a shutter button operated by an operator, 9 a driving device including an electric motor (not shown) to drive the movable recording medium 5, 10 a rotational speed detecting circuit for detecting the number of rotations of the recording medium 5 per unit time (namely, the rotational speed of the recording medium 5), and 11 a scanning circuit for electrically scanning the image sensor 3 to generate a series of signals representative of a picture image formed on the image sensor 3.

FIG. 2 shows an outline of the time sequental processing performed by several portions of the conventional electronic still camera shown in FIG. 1, to explain the operation of the camera.

First, the shutter button 8 is depressed at a time $T=T_0$. Then, a signal such as shown in part (a) of FIG. 2 is supplied to the control circuit 6, and the power source 7 begins to supply electric power of a predetermined voltage to each block. As shown in part (b) of FIG. 2, the supply voltage applied to each block takes the predetermined value which is a lower limit for operating each block, at a time $T=T_1$. At this time, the image sensor 3 is changed from an operation stopped state (hereinafter referred to as "A-state") to a scanning/reading state (hereinafter referred to as "B-state") as shown in part (d) of FIG. 2, and other blocks also begin to operate. A time interval between the time $T_0$ and time $T_1$ is usually less than 0.1 sec. Since the driving device 9 has a rotating mechanism including an electric motor (not shown) for rotating the magnetic disc, the moment of inertia of a rotating portion is large. Accordingly, the rotational speed of the rotating portion increases gradually as shown in part (c) of FIG. 2, and thus the recording medium 5 reaches a rotational speed which makes possible a recording operation for the medium 5, at a time $T=T_2$. Although a time interval between the time $T_0$ and time $T_2$ depends upon the moment of inertia of the rotating portion and the driving force of the motor for rotating the magnetic disc, it is difficult to make the above time interval less than 0.5 sec because of the size of the camera and the capacity and size of a built-in battery serving as the power source 7. A first drawback of the conventional electronic still camera which will be mentioned later, is caused by the fact that it takes time for the driving device 9 to have a constant rotational speed.

The rotational speed detecting circuit 10 detects the rotational speed of the recording medium 5 to deliver a signal indicating that the rotational speed of the recording medium 5 has reached a constant value. The control circuit 6 responds to the above signal to open the shutter 2 for a period between the time $T=T_2$ and a time $T=T_3$ as shown in part (e) of FIG. 2. Thus, light from the lens 1 is allowed to be incident upon the image sensor 3, and an optical image of a body to be imaged is formed on the element 3. The optical image is converted through the photoelectric conversion effect of the image sensor 3 into an electric output, which is read out in the order indicated by the scanning circuit 11 to form a series of signals representative of the optical image. The series of signals is processed by the signal processing circuit 4 simultaneously with the above reading operation so as to have a form suitable for recording, and then recorded on the recording medium 5 as shown in part (f) of FIG. 2. That is, the recording operation is started at the time $T=T_3$, and completed at a time $T=T_4$.

The above imaging recording processing has a drawback that a time period between the time the shutter button 8 is depressed and the time the shutter 2 is actually opened, is long, that is, more than 0.5 sec for the main reason that the moment of inertia of the driving device 9 is large. Accordingly, it is difficult to release the shutter at a desired time, and it is actually impossible to obtain a still picture image of a moving body viewed in a desired direction. This is the first drawback of the conventional electronic still camera.

A second drawback of the above camera is that the effective exposure time cannot be made long. In more detail, when the shutter button 8 is depressed, the signal processing circuit 4 performs the recording operation for the recording medium 5 only once. Accordingly, no matter how long the shutter is kept open, the effective shutter speed cannot be made longer than 1/30 sec. That is, the image sensor 3 is scanned in such a manner that a TV signal is formed, and therefore the electric charge which is produced in the element 3 by light, is read out at intervals of 1/30 sec which is twice longer than the period of a vertical synchronizing signal, independently of the state of the shutter 2. At the same time as the electric charge is read out, the signal processing circuit 4 supplies a signal corresponding to the electric charge to the recording medium 5. For a single operation of the shutter button 8, the recording operation is performed only once, and therefore only a signal corresponding to one scanning period for the image sensor 3 is recorded on the recording medium 5. No matter how long the shutter 2 is kept open after the above recording operation has been performed, the electric charge accumulated in the element 3 is merely cleared by the scanning operation at intervals of 1/30 sec, since the element 3 is of a destructive readout type. Thus, no matter how long the shutter 2 is kept open, only the electric charge which is accumulated for a period of 1/30 sec, is supplied to the signal processing circuit 4. Accordingly, one picture image recorded on the recording medum 5 has only an exposure time of 1/30 sec at most. This is the second drawback of the conventional electronic still camera.

SUMMARY OF THE INVENTION

An object of the present invention is to provide an electronic still camera which eliminates the drawbacks of the prior art and can record a picture image which is formed immediately after a shutter button has been depressed.

Another object of the present invention is to provide an electronic still camera in which an effective exposure time can be made long.

In order to attain the above objects, according to the present invention, there is provided an electronic still camera including an image sensor having a light receiving region to convert an image formed on the light receiving region into an electric output and deliver a series of signals representative of the image when scanning and reading operations are performed for the image sensor, shutter means performing the opening and closing action to control a period when the image is incident upon the light receiving surface of the image sensor, scanning means connected to the image sensor for performing scanning and reading operations for the image sensor, recording means for recording the series of signals from the image sensor on a recording medium, a power source for supplying electric power to the image sensor, shutter means, scanning means and recording means, and shutter release means for starting an image producing operation, wherein the shutter means is opened in response to the operation of the shutter release means, the scanning and reading operations for the imaging element are inhibited for at least part of a period when the shutter means is kept open, and the state that the scanning and reading operations are inhibited is maintained till a recording operation is started.

BRIEF DESCRIPTION OF THE DRAWINGS

These and other objects and features of the present invention will become apparent from the following description taken in conjunction with the accompanying drawings, in which.

DETAILED DESCRIPTION OF THE PREFERRED EMBODIMENT

As mentioned above, the drawbacks of the conventional electronic still camera are caused by the fact that a time necessary for a rotating mechanism for driving the recording medium to have a constant rotational speed is usually more than 0.5 sec since the moment of inertia of the rotating mechanism is large, and both an image producing operation and a recording operation are performed after the rotational speed of the rotating mechanism has become constant. As a result of an investigation on the above drawbacks, the present inventors have paid attention to the fact that although the recording operation must be performed after the rotational speed of the rotating mechanism has become constant or nearly constant, the image producing operation can be performed immediately after the shutter button has been depressed since the supply voltage applied to each block rises to the predetermined value immediately after the shutter button has been depressed. That is, according to the present invention, the image producing operation is performed by making the shutter open immediately after the shutter button has been depressed, and an image thus produced is held in the image sensor till the rotational speed of the rotating mechanism becomes constant. The image can be held in the following manner. That is, an electric charge which is accumulated in the image sensor in accordance with a picture image for a period when the shutter is kept open, is prevented from being supplied to the signal processing circuit by stopping the operation of the scanning circuit, to be held by the image sensor.

Figure 1:
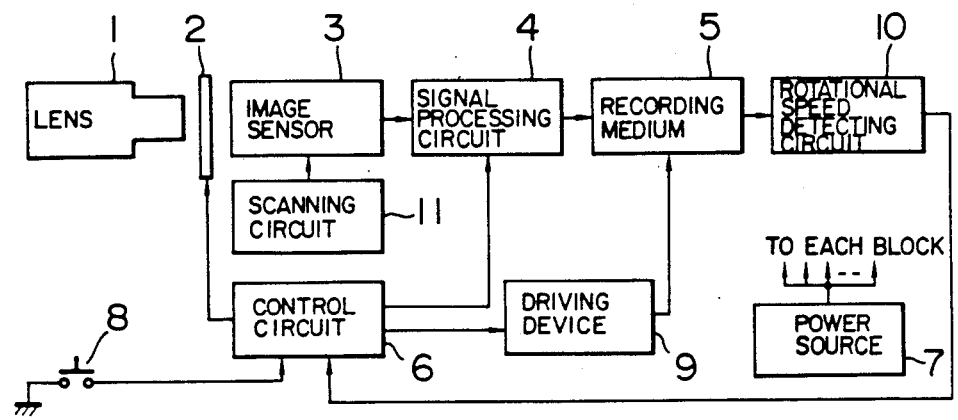
FIG. 1 is a block diagram showing the construction of a conventional electronic still camera.
Figure 2:
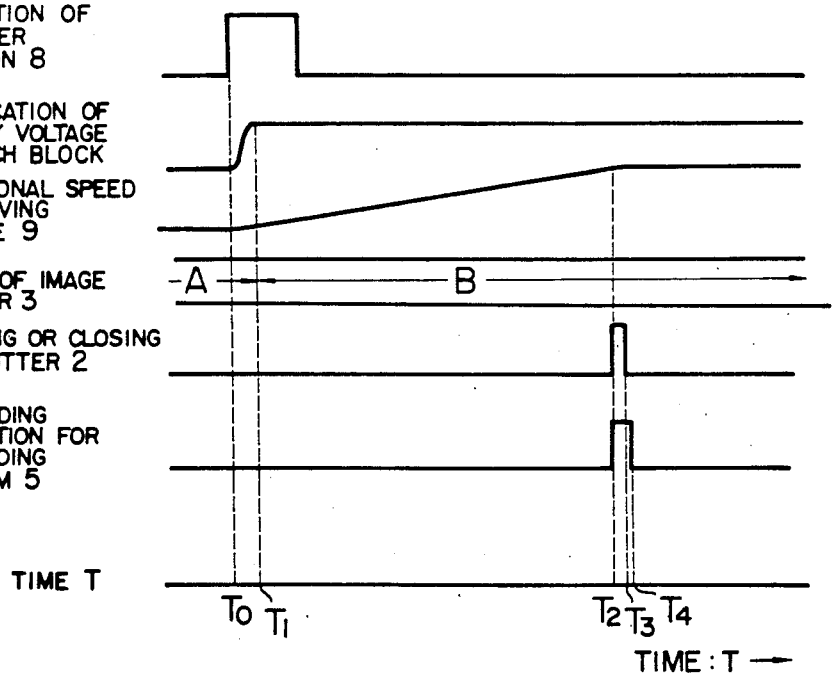
FIG. 2 shows sequential operations of several portions of the camera shown in FIG. 1.
Figure 3:
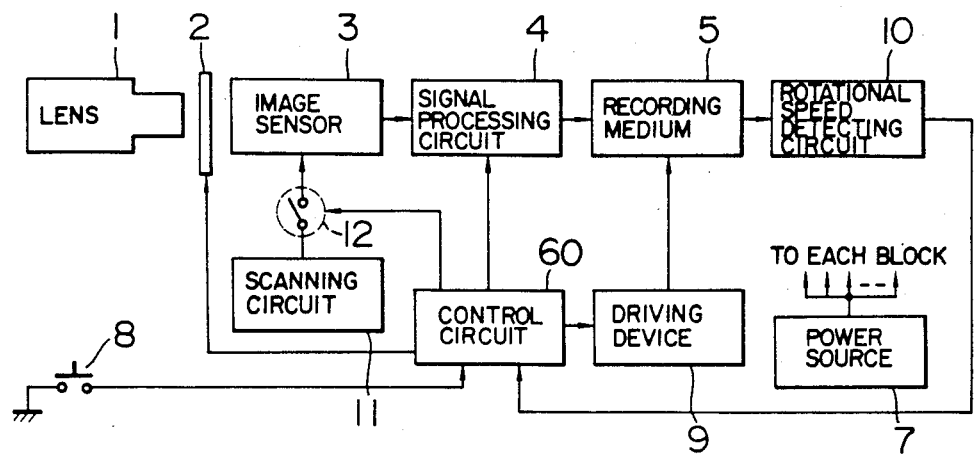
FIG. 3 is a block diagram showing an embodiment of an electronic still camera according to the present invention and FIG. 4 shows sequential operations of several portions of the embodiment shown in FIG. 3.
Figure 4:
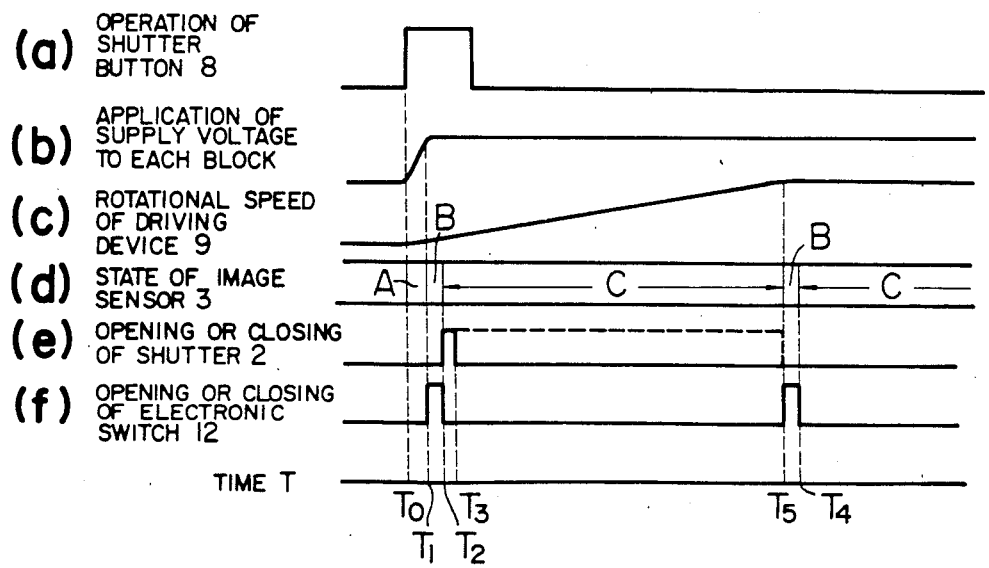

Now, an embodiment of an electronic still camera according to the present invention will be explained below in detail, with reference to FIGS. 3 and 4. FIG. 3 is a block diagram showing the construction of the above embodiment, and FIG. 4 shows sequential operations of several portions of the embodiment. In FIG. 3, reference numerals 1, 2, 3, 4, 5, 7, 8, 9, 10 and 11 designate a lens, a shutter, an image sensor, a signal processing circuit, a recording medium, a power source, a shutter button, a driving device, a rotational speed detecting circuit and a scanning circuit, respectively. The above circuits and parts are identical with or equivalent to those indicated by the same reference numerals in FIG. 1 which shows a conventional electronic still camera, and therefore detailed explanation of these circuits and parts is omitted. Further, in FIG. 3, reference numeral 12 designates an electronic switch for transmitting or cutting a control signal sent from the scanning circuit 11 to the image sensor 3, and 60 a control circuit. Although the control circuit 60 is similar in function to the control circuit 6 shown in FIG. 1, the circuit 60 further has a function of controlling the ON-OFF action of the electronic switch 12. When the function of controlling the electronic switch is removed from the control circuit 60 so that the circuit 60 becomes equal in function to the control circuit 6, and the electronic switch 12 is always kept at the closed state, the present embodiment has the same construction as the conventional electronic still camera shown in FIG. 1. Accordingly, the present invention is intended to provide an electronic still camera which additionally includes the electronic switch 12, and in which the control circuit 60 has a function of controlling the electronic switch 12.

Now, the operation of the present embodiment will be explained below, with reference to FIG. 4. When the shutter button 8 is operated at a time $T=T_0$ as shown in part (a) of FIG. 4, the power source 7 is turned on. Thus, a predetermined supply voltage is obtained at a time $T=T_1$, and each block begins to operate at this time. However, similarly to the conventional example shown in FIG. 1, the driving device 9 has a constant rotational speed at a time $T=T_5$ as shown in part (c) of FIG. 4, since the moment of inertia of the driving device 9 is large. It is to be noted that the state of the image sensor 3 changes as shown in part (d) of FIG. 4. That is, the image sensor 3 takes that A-state for the period between the time $T_0$ and time $T_1$ and is put in the B-state immediately after the predetermined supply voltage has been obtained, as in the conventional example shown in FIG. 1, but is put in a new state (hereinafter referred to as "C-state") at a time $T=T_3$, that is, only a little after the time $T=T_2$. The C-state is a state in which can electric charge accumulated in the light receiving surface of the image sensor 3 in accordance with a picture image is held without being subjected to scanning and reading operations. Such a state is obtained by putting the electronic switch 12 in an open state. That is, all or part of a scanning signal which is outputted from the scanning circuit 11 to read out the electric charge from the image sensor 3, is prevented from being supplied to the image sensor 3. The above operation of the electronic switch 12 is shown in part (f) of FIG. 4. As shown in the above part (f), the electronic switch 12 is closed for a period between the time $T_1$ and time $T_2$. That is, a scanning operation is performed for this period, to previously read out (or clear) the electric charge accumulated in a transient period when the power source is turned on, before the shutter 2 is opened to accumulate electric charge in the photoelectric conversion surface of the image sensor 3 in accordance with an optical image of a body to be imaged. In order to clear the electric charge accumulated over the whole photoelectric conversion surface, the period between $T_1$ and $T_2$ is required to be longer than a time necessary to perform scanning and reading operations for the whole image surface of the image sensor 3. In more detail, the above necessary time is about 1/30 sec for a solid-state image sensor element subjected to frame readout and accumulation, and is on the order of 1/60 sec for other solid-state image pickup devices.

The accumulated electric charge is cleared by the above operation and thus the control circuit 60 turns off the electronic switch 12 at the time $T=T_2$ to inhibit the scanning and reading operations for the image sensor 3. The control circuit 60 can make the shutter 2 open at the time $T=T_2$. Part (e) of FIG. 4 shows the case where the shutter 2 is kept open for a period between the time $T_2$ and time $T_3$ and electric charge corresponding to an optical image of a to-be-imaged body is accumulated and held in the photoelectric conversion surface of the image sensor 3 for this period. The period when the shutter 2 is kept open, is previously determined, or automatically set to an appropriate value. In ordinary cases, scanning and reading operations for the electric charge held in the image sensor 3 are preformed immediately after the rotational speed of the driving device 9 has become constant, that is, at the time $T=T_5$, as shown in parts (c) and (f) of FIG. 4, and therefore the open period of the shutter 2 is set within a period between $T_2$ and $T_5$ which is indicated by a broken line in part (e) of FIG. 4. That is, the electric charge accumulated in the image sensor 3 is held till the control circuit 60 detects that the rotational speed of the driving device 9 has become constant, and increases with the open period of the shutter 2. As shown in part (f) of FIG. 4, the control circuit 60 again turns on the electronic switch 12 at the time $T=T_5$, and thus the electric charge held in the image sensor 3 is read out on the basis of the operation of the scanning circuit 11 for a period between the time $T_5$ and time $T_4$. The electric charge thus read out is sent through the signal processing circuit 4 to the recording medium 5, to be recorded thereon.

In the above operation of the embodiment, the period between the time the shutter button 8 is depressed (that is, the time $T=T_0$) and the time the recording operation is completed (that is, the time $T=T_4$) is substantially the same as in the conventional electronic still camera. However, the present embodiment is different from the conventional camera in the contents of a picture image recorded on the recording medium. That is, in the conventional electronic still camera, a picture image obtained when the period between $T_0$ and $T_4$ (actually, about 0.5 sec) has elapsed after the shutter button 8 was depressed, is recorded. On the other hand, in the present embodiment, a picture image obtained at the time $T=T_2$, that is, a picture image obtained when about 0.1 sec has elasped after the shutter button 8 was depressed, is recorded. Accordingly, the present embodiment can eliminate the previously-mentioned first drawback of the conventional electronic still camera, and makes it very easy to obtain a picture image of a moving body at a desired time.

Further, in the present embodiment, scanning and reading operations for the electric charge accumulated in the image sensor 3 are inhibited by the electronic switch 12 during a period when the shutter 2 is kept open. Accordingly, the electric charge accumulated in the image sensor 3 increases as the open period of the shutter 2 is longer. Thus, the present embodiment can eliminate the previously-mentioned second drawback.

In the above description, explanation has been made on the case where the shutter is kept open for a relatively short time (namely 0.5 sec or less), with reference to FIG. 4. However, when it is desired to keep the shutter open for a time longer than 0.5 sec, the control circuit 6 does not turn on the electronic switch 12 at the time $T=T_5$ (namely, when the rotational speed of the driving device 9 becomes constant), but turns on the switch 12 after the shutter 2 has been closed, in order for the electric charge held in the image sensor 3 to be read out and then recorded on the recording medium.

As explained above in detail, according to the present invention, there is provided an electronic still camera which can eliminate the first and second drawbacks of the conventional camera, and in which effective exposure time can be made long and a picture image of a moving body is obtained at a desired time. In the embodiment shown in FIG. 3, scanning and reading operations for the image sensor 3 are inhibited by the action of the electronic switch 12 which is provided external to the control circuit 60.

However, since a gist of the present invention resides in that some means for inhibiting the scanning and reading operations is used, a function of inhibiting the above operations may be incorporated in the scanning circuit 11 depending on the type of an image sensor 5, so that the scanning circuit 11 performs this function in place of the external electronic switch 12. Although the detailed structure of control circuit 60 and the rotational speed detecting mechanism of the driving device 9 are not specifically shown in the embodiment, the control circuit 60 which is obtained by adding a function of controlling the electronic switch 12 to the conventional control circuit 6, can be readily formed by those skilled in the art, through the ordinary digital circuit technology or by utilizing a microcomputer. Further, the rotational speed detecting mechanism can be readily realized by utilizing ordinally servo control techniques.

We claim:

1. An electronic still camera comprising:

an image sensor having a light receiving region to convert an image formed on said light receiving region into an electric output and to deliver a series of signals representative of said image when scanning and reading operations are performed for said image sensor, shutter means performing an opening and closing action to control a period when said image is in incident upon said light receiving region of said image sensor, scanning means connected to said image sensor for performing scanning and reading operations for said image sensor, recording means for recording said series of signals from said image sensor on a recording medium, a power source for supplying electric power to at least said image sensor shutter means, scanning means and recording means, shutter release means for starting an image producing operation, and control means for enabling opening of said shutter means in response to the operation of said shutter means, said control means enabling inhibiting of said scanning and reading operations for said image sensor for at least part of a period when said shutter means is kept open, the inhibiting of said scanning and reading operations being maintained till a recording operation is started.

2. An electric still camera according to claim 1, wherein said power source is turned on in response to the operation of said shutter release means, and said control means enables opening of said shutter means immediately after a supply voltage of said power source has reached a predetermined value.

3. An electronic still camera according to claim 1, wherein said recording means includes driving means for causing said recording medium to make a relative motion for said recording means.

4. An electric still camera according to claim 3, wherein said control means enables starting of said recording operation of said recording means after said driving means has reached a stable operating state.

5. An electronic still camera according to claim 1, wherein said scanning means includes switch means responsive to said control means for cutting or transmitting a scanning signal supplied to said image sensor.

6. An electronic still camera according to claim 1, wherein said image sensor is of a destructive readout type, and said recording operation of said recording means is performed simultaneously with scanning and reading operations for said image sensor.

7. An electronic still camera according to claim 1, wherein said control means enables subjecting of said image sensor to a reading operation by said scanning means before said shutter means is opened.

* * * * *